United States Patent [19]
McCauley et al.

[11] Patent Number: 6,067,533
[45] Date of Patent: May 23, 2000

[54] METHOD AND APPARATUS FOR DETERMINING AN OPTIMAL INVESTMENT PLAN FOR DISTRESSED RESIDENTIAL REAL ESTATE LOANS

[75] Inventors: John J. McCauley, Chantilly; Phillip E. Comeau, Great Falls; John A. Vella; Elizabeth M. Botkin, both of Reston; Nicole Lewis, Fairfax, all of Va.

[73] Assignee: Freddie Mac, McLean, Va.

[21] Appl. No.: 09/237,239

[22] Filed: Jan. 26, 1999

Related U.S. Application Data

[63] Continuation of application No. 08/782,643, Jan. 14, 1997, Pat. No. 5,930,775.

[51] Int. Cl.$^7$ .................................................. G06F 17/60
[52] U.S. Cl. ............................................ 705/38; 705/35
[58] Field of Search .................... 705/38, 26, 35

[56] References Cited

U.S. PATENT DOCUMENTS

| | | | |
|---|---|---|---|
| 4,739,478 | 4/1988 | Roberts et al. | 705/38 |
| 4,876,648 | 10/1989 | Lloyd | 705/38 |
| 5,699,527 | 12/1997 | Davidson | 705/38 |
| 5,742,775 | 4/1998 | King | 705/38 |
| 5,774,883 | 6/1998 | Andersen et al. | 705/38 |

*Primary Examiner*—Eric W. Stamber
*Assistant Examiner*—Jagdish Patel
*Attorney, Agent, or Firm*—Finnegan, Henderson, Farabow, Garrett & Dunner, LLP

[57] ABSTRACT

Methods, system, and article of manufacture are provided for processing real estate loans based on loan data including personal data relating to a borrower, financial information relating to the borrower's financial position, and loan conditions including a loan term and information on the corresponding real estate, related to a real estate loan. Such methods, system, and article of manufacture generate a comparison model including an ability-to-pay rate reflecting an interest rate on the loan reflecting the borrower's ability to repay a loan having the loan conditions, a default rate reflecting an interest rate realizable if the loan is foreclosed and a new loan secured by the real estate originated, and a minimum rate reflecting an interest rate realizable if protocols from a sale of the real estate before expiration of the loan term are determined to be acceptable and a new loan secured by the real estate originated. Using a relationship determined from the ability-to-pay rate, the default rate, and the minimum rate of the comparison model, as well as a predetermined current return rate, the methods, system, and article of manufacture select an acceptable return rate for the loan.

9 Claims, 6 Drawing Sheets

| LOAN NUMBER: 789789769<br>STATE: CA<br>UPB: $125,000.00 | REO | SHORT PAYOFF | DEED-IN-LIEU | CHARGE-OFF | MOD (9 YR RE-DEFAULT) |
|---|---|---|---|---|---|
| INCOME CATEGORIES | | | | | |
| GROSS SALES PRICE | $100,000 | $120,000 | $100,000 | $0 | |
| -PROJECTED DEPRECIATION | $0 | $0 | $0 | $0 | |
| PROJECTED GROSS SALES PRICE | $100,000 | $120,000 | $100,000 | $0 | |
| ESCROW BALANCE | $513 | $513 | $513 | $513 | |
| MI PROCEEDS | $0 | $0 | $0 | $0 | |
| CASH CONTRIBUTION/COLLATERAL LOSS | $0 | $500 | $0 | $0 | |
| CASH CONTRIBUTION TWDS CLOSING | $0 | $600 | $0 | $0 | |
| NOTE CONTRIBUTION (WEIGHTED) | $0 | $0 | $0 | $0 | |
| HAZARD INSURANCE PROCEEDS | $0 | $0 | $0 | $0 | |
| MISCELLANEOUS INCOME | $0 | $0 | $0 | $0 | |
| TOTAL INCOME | $100,513 | $121,613 | $100,513 | $513 | |
| EXPENSE CATEGORIES | | | | | |
| LIENS (JUNIOR AND SENIOR) | $0 | ($5,610) | $0 | $0 | |
| TAXES | ($7,544) | ($3,933) | ($5,949) | ($3,648) | |
| INSURANCE | ($1,453) | ($757) | ($1,145) | ($702) | |
| MAINTENANCE/UPKEEP | ($2,175) | $0 | ($1,803) | $0 | |
| SALES COMMISSION | ($6,000) | ($6,000) | ($6,000) | $0 | |
| OTHER SELLING EXPENSES | ($2,000) | ($490) | ($2,000) | $0 | |
| BPO/APPRAISAL | ($425) | ($100) | ($425) | $0 | |
| FORECLOSURE ATTY FEES/COSTS | ($1,637) | $0 | $0 | $0 | |
| BANKRUPTCY ATTY FEES/COSTS | ($241) | $0 | $0 | $0 | |
| EVICTION ATTY FEES | ($210) | $0 | ($210) | $0 | |
| EVICTION ATTY COSTS | ($180) | $0 | ($180) | $0 | |
| MISCELLANEOUS EXPENSES | ($103) | $0 | ($103) | $0 | |
| TOTAL EXPENSES | ($21,968) | ($16,890) | ($17,816) | ($4,351) | |
| ESTIMATED TOTAL DEBT | $160,307 | $140,980 | $146,468 | $139,725 | |
| ECONOMIC PROCEEDS: | $78,545 | $104,723 | $82,697 | ($3,838) | |
| CARRY COST: | ($7,002) | ($778) | ($4,343) | $5 | |
| ECONOMIC/ NET PRESENT VALUE | $71,543 | $103,946 | $78,354 | ($3,833) | |
| TDR LOSS (FOR MODS) | | | | | |
| SAVINGS OVER REO | | $32,403 | $6,811 | ($75,376) | $61,655* |
| | | | | | |
| TOTAL DAYS IN PROCESS: | 823 | 430 | 649 | 398 | |
| %RECOVERY: | | | | | |
| -NET SETTLEMENT PROCEEDS TO MV | 92% | 108% | 92% | 0% | |
| -DISCOUNTED VALUE TO MV | 72% | 104% | 78% | -4% | |
| ACTUAL TAXES/ESCROW DISBURSED AT CLOSING | $0 | | | | |
| SETTLEMENT NET PROCEEDS: | $92,000 | $107,900 | $92,000 | | |
| SETTLEMENT TOTAL PROCEEDS: | $92,000 | $109,000 | $92,000 | | |

FIG. 6

METHOD AND APPARATUS FOR DETERMINING AN OPTIMAL INVESTMENT PLAN FOR DISTRESSED RESIDENTIAL REAL ESTATE LOANS

This is a continuation of application Ser. No. 08/782,643, filed Jan. 14, 1997, which is incorporated herein by reference.

BACKGROUND OF THE INVENTION

1. Field of the Invention

This invention generally relates to methods for assisting in the determination of an optimal investment plan and, more particularly, to a method for selecting a rate of return on a nonperforming loan that minimizes the investor's loss potential.

2. Description of the Related Art

Maximizing the rate of return on investment dollars is the goal of all investors. Banks and similar institutions in the real estate business maximize their return realizable on loans by, for example, lending money to customers to purchase property and charging interest for the loan at a rate above their borrowing cost. The loan instrument is often referred to as a promissory note that specifies a principal amount borrowed from the lender and an interest rate, and is secured by a mortgage or deed of trust on the property. The lender's rate of return corresponds to the interest rate.

Promissory nots typically require the borrower to make periodic (often monthly) payments to the lender. Each payment usually includes a portion of the principal and interest. Generally speaking, the borrower completes her loan obligation by making a lump sum payment before the end of the period to satisfy the loan.

But not all borrowers can consistently make loan payments. Due to events often out of their control, for example, unexpected medical expenses or a layoff, borrowers sometimes stop making payments. Sometimes they stop making payments for only a short period of time and sometimes they stop making payments altogether. For these nonperforming loans, the lender has a number of options, each of which provides the lender with a different rate of return. Although all of the options are viewed as unattractive when compared to the lender's originally expected rate of return on a loan, the investor's objective in selecting an option is to choose one that maximizes the rate of return and minimize the loss potential.

One option is to foreclose on the property. The foreclosure process is a legal proceeding by which the lender will ultimately obtain title to the property. Invariably, the lender then sells the property. The cost of a foreclosure and holding the property until it is sold increases the lender's overall investment in the property. Unless the sale price for the property is substantially higher than the original value, the increased investment due to the foreclosure may reduce the lender's rate of return on the loan. The difficulties and contingencies of the foreclosure make it an unfavorable approach for dealing with certain nonperforming loans.

Another option is to allow the borrower to sell the property and pay off the loan. Although this option may seem appealing because it avoids dealing with the costly foreclosure procedure, selecting this option may give the lender less than the outstanding amount owed on the loan, unless the borrower is able to pay the difference between the lower sale price and the outstanding amount on the loan. When the lender's proceeds from the sale is less than the full amount of the loan, this is called a short payoff. A short payoff reduces the lender's rate of return on the loan, making the second option also unattractive to the lender for dealing with certain nonperforming loans.

A third option, which also avoids a costly foreclosure, would be for the borrower to simply sign over the deed for the property to the lender. The lender thus accepts a deed-in-lieu of foreclosure. Like the first option, this one burdens the lender with holding the property for a period of time and selling it, and, like the second option, the lender may have to sell the property for less than its market value or the outstanding amount of the loan. For at least these reasons, this option is also unattractive to the lender for dealing with certain nonperforming loans.

The lender's fourth option is to recognize the loan as a complete loss, writing off the principal. This option may only be appropriate when the anticipated coast associated with alternatives such as the foreclosure option (payoff of a superior lien, for example) exceed anticipated revenues from a sale of the property. For obvious reasons, this option has the lowest rate of return for the lender, making it the least attractive option for dealing with nonperforming loans.

A fifth option is to modify the conditions of the loan. This may mean decreasing the interest rate for a period of time, capitalizing past due payments into the principal amount of the loan, or making another type of modification. This allows the lender to obtain a rate of return that may approach its expected rate of return for the loan, making it a more favorable approach for dealing with certain nonperforming loans.

A sixth option is to allow an assumption of the loan by a third party who would assume responsibility for loan payments that the borrower can no longer satisfy.

A simplification of the fifth option has the lender arrange a repayment plan whereby the borrower repays a percentage of the past due payments each month in addition to the regular payment. This option is appropriate under limited circumstances, i.e., primarily when the borrower's financial information indicates either funds on hand or expected income sufficient to satisfy both primary payments on the existing loan and additional payments. This repayment plan may give the lender a rate of return higher than any other option, which makes it perhaps the most favorable approach for dealing with certain nonperforming loans.

With so many options, each with its own advantages and disadvantages, and related variables, lenders find it difficult to determine the best option for a particular situation. Historically, lenders have examined each option and tried to implement the one that seemed most viable. Lenders have heretofore been unable to evaluate the acceptability of the different options using a quantitative analysis and comparison.

It is therefore desirable to seek techniques that can provide lenders with a scheme for applying selection criteria in a consistent manner to better inform lenders considering options for nonperforming loans. The scheme should also help lenders select the best option for each case, considering the borrower's financial condition and any hardships that caused the lender to categorize the loan as a nonperforming one.

SUMMARY OF THE INVENTION

In accordance with the present invention, as embodied and broadly described herein, a method for selecting a business plan for nonperforming real estate loans comprises the steps, performed by a processor, of: receiving loan data about a borrower including personal data relating to the borrower, financial information relating to the borrower's financial position, and an unpaid loan amount, and loan conditions including a loan term, a loan amount, and an interest rate, relating to a real estate; analyzing the borrower's financial information to determine an ability-to-pay rate reflecting an interest rate indicting the borrower's ability to repay a loan having the loan conditions; comparing the ability-to-pay rate and the interest rate of the loan conditions to determine whether the borrower can repay the unpaid loan amount; and generating a repayment plan reflecting the ability to pay rate and the loan conditions if the comparison indicates that the borrow can repay the unpaid loan amount.

In accordance with another aspect of the present invention, when the comparison of the ability-to-pay rate and the interest rate of the loan conditions indicates that the borrow cannot repay the unpaid loan amount, the method for selecting a business plan for nonperforming real estate loans comprises: determining from the loan data a default rate reflecting an interest rate realizable if the loan is foreclosed and a new loan secured by the real estate originated; determining from the requested loan data a minimum rate reflecting an interest rate realizable if proceeds from a sale of the real estate before expiration of the loan term are determined to be acceptable and a new loan secured by the real estate originated; generating in the processor a comparison model from the customer's financial data, the comparison model including the ability-to-pay rate, the default rate, and the minimum rate; analyzing the comparison model to determine a relationship among the ability-to-pay rate, the default rate, the minimum rate, and a predetermined current return rate; extracting lender preferences from a constrains database; and selecting an acceptable return rate for the loan based on the determined relationship, the lender preferences, and the personal data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate an embodiment of the invention and, together with the description, explain the advantages and principles of the invention. In the drawings.

FIG. 6 is an exemplary analyze sheet generated by the investment planing system consistent with the present invention.

DETAILED DESCRIPTION

Reference will now be made in detail to an implementation of the present invention as illustrated in the accompanying drawings. Wherever possible, the same reference numbers will be used throughout the drawings and the following description to refer to the same or like parts.

Overview

Systems consistent with the present invention provide a comprehensive decision making tool for lenders to select the optimal business plan for nonperforming loans. This is accomplished by generating models for each alternative available to the lender for a nonperforming loan consistent with information on conditions related to the loan and the borrower' financial position. There is a model for each of the foreclosure, short payoff, deed-in-lieu of loan, write off (also known as a "charge off"), and loan modification options.

Some models, such as those for the foreclosure, short payoff, and deed-in-lieu of loan options pay little attention to the borrower's financial position. They focus primarily on information related to the loan conditions and past experience with similar nonperforming loans. The loan experience information generally includes the lender's costs associated with adopting the modeled approach.

Other models, such as those for the write off and loan modification options, pay less attention to the loan experience information, and concentrate primarily on the loan conditions. The loan modification model primarily concerns the information on the borrower's financial position.

Although not a formal model, the repayment plan option may be selected based on the information related to the models. Based on the borrower's financial position, the lender may find that repayment plan offers the highest rate of return.

After the models are generated, the results can be compared effectively to choose the best approach for handling the nonperforming loan. This comparison involves determining the lender's potential gain or loss related to the selection of each option. The objective is to select the option with the best potential rate of return for the lender.

The comparison also concerns a determination of the location of a calculated rate corresponding to the borrower's ability to continue making loan payments, i.e., an "ability-to-pay rate," in relation to at least three potential rates of return available to the lender. The first is the lender's potential rate of return on its investment if the lender chooses to select a business plan related to the model for a foreclosure. The second is the lender's potential rate of return on its investment if the lender chooses to select a business plan related to the model for a short payoff. The third is the lender's potential rate of return on its investment if the lender chooses to invest the same money at prevailing interest rates. This aspect of the comparison is explained best with reference to FIG. 1.

Loan Modification Option

Figure 1:
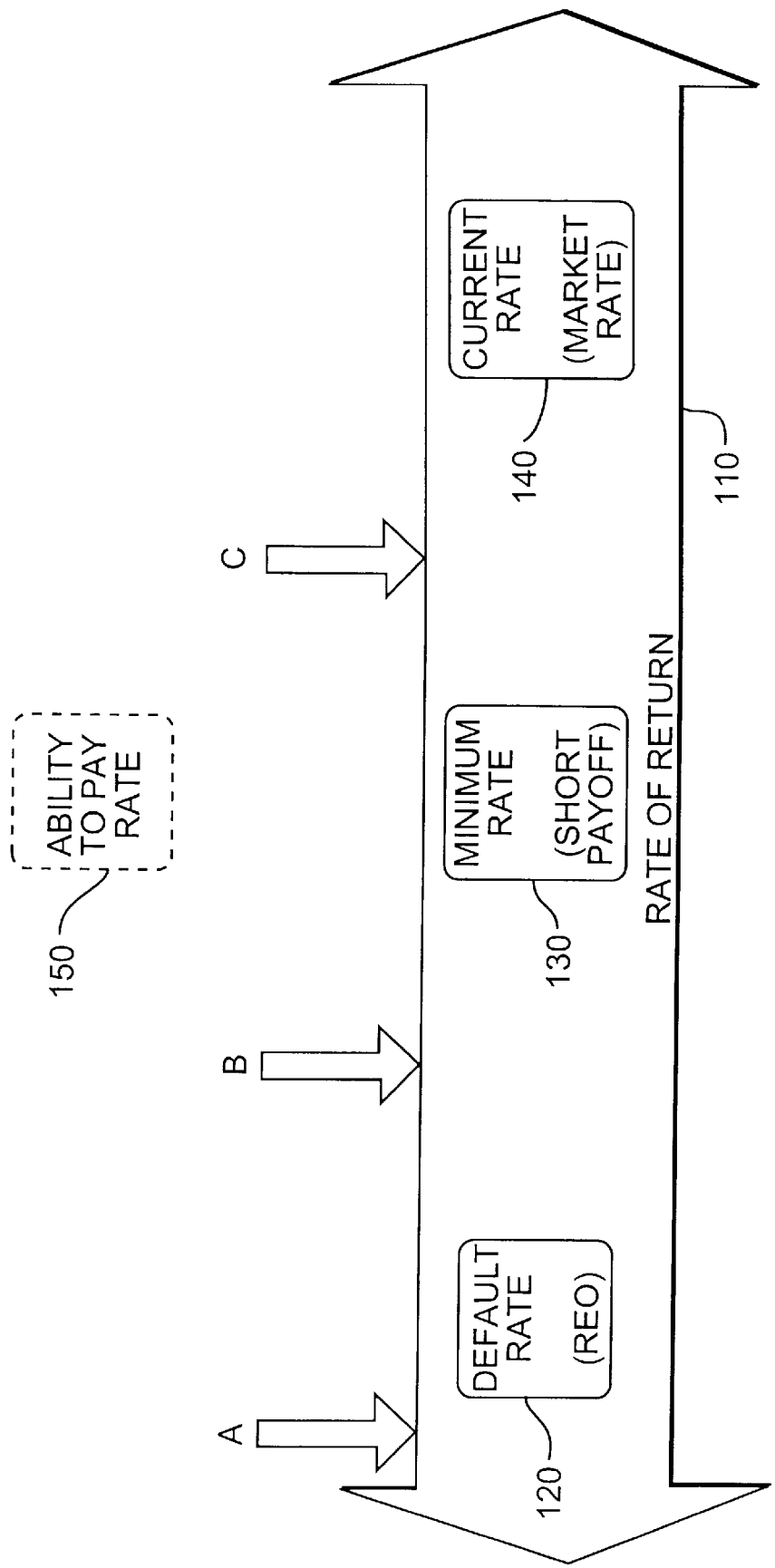
FIG. 1 is a diagram illustrating a relationship among rate of return associated with nonperforming loan options consistent with the present invention.

FIG. 1 shows a scale 110 of potential rates of return for lenders in connection with options for dealing with nonperforming loans, including "Default Rate" 120, "Minimum Rate" 130, and "Current Rate" 140. At the left, lower end of scale 110 is a rate of return related to a foreclosure. As shown, this "Default Rate" 120 is typically the lowest potential rate of return that a lender may obtain from a nonperforming loan. The acronym "REO" stands for "Real Estate Owned", which refers to the practice of the lender taking ownership of the property. It is important to note that the lender is also viewed as an investor, having invested money in the loan to receive a return on that investment.

Default Rate 120 comes from an REO model that determines the lender's likely costs associate with a foreclosure based in part on the lender's past experience with similar foreclosures and in part on information on the property itself. These "predicted" foreclosure costs (e.g., expenses for legal proceedings and related administrative fees) are added to any other costs associated with the nonperforming loan (e.g., taxes, insurance, and other expenses involved in holding the property before resale), and the total costs are subtracted from the lender's likely cash proceeds from a sale of the property. All proceeds and expense amounts are economically discounted to a net present, or economic value associated with this foreclosure scenario. The result constitutes the lender's anticipated economic value of the nonperforming loan, and is used to calculate Default Rate 120 based on the lender's investment and the period of that investment. The Default Rate 120 is calculated in two steps: (1) determining a value for the periodic cash flow that would be generated from the anticipated economic value invested at the Current Rate 140, and (2) determining the interest rate at which the cash flow would be generated from the newly-modified loan balance.

Considered a minimum rate of return, the rate of return 130 for a short payoff situation is typically higher than Default Rate 120 because the short payoff does not require the lender to incur costs associated with a foreclosure. Because the anticipated costs are lower, the anticipated proceeds net of costs is then higher. Thus, Minimum Rate 130 is shown to the right of Default Rate 120, or higher on the illustrated scale 110. Minimum Rate 130 is determined from a short payoff model that determines the lender's likely costs and anticipated economic value associated with a short payoff of the loan. Minimum Rate 130 is then calculated in the same fashion as Default Rate 120, although Minimum Rate 130 does not involve the predicted foreclosure costs. Instead, Minimum Rate 130 is calculated in a manner similar to that described for Default Rate 120. It also accounts, however, for a proposed sale price for the property with the sale to occur sooner than a sale in the foreclosure option.

The third return rate, Current Rate 140, is the rate of return corresponding to the prevailing or current interest rate on new, non-distressed loans purchased by the lender, which is the reason for the reference to "Market Rate" associate with Current Rate 140. The reason for including Current Rate 140 in scale 110 is because it provides a good measure against the alternatives, i.e., Default Rate 120 and minimum Rate 130, when considering information on the borrower's financial position. The use of Current Rate 140 permits the lender to make a well-informed selection of the loan modification option when considering the alternative rate of return for the additional investment associated with lending the borrower more money for the loan modification. It also permits the lender to consider the repayment plan scheme as an option because it too concerns the lending of additional money to the borrower.

Although the relationship illustrated in scale 110 may not always be accurate, for example if Current Rate 140 is lower than Minimum Rate 130, for purposes of this description scale 110 is assumed accurate. If the relationship is different at the time the lender is considering the options and, for example, Current Rate 140 is lower than Minimum Rate 130, this would affect the lender's selection of an option.

For the lender to consider the loan modification option effectively, an ability-to-pay rate 150 is calculated from the borrower's financial information. This rate corresponds to an amount of money that the borrower is considered to be able to pay for a loan based on his available net income. The calculation considers the borrower's total income, total reasonable expenses, with the difference between these figures providing the borrower's available net income. Depending on where the ability-to-pay rate 150 falls on scale 110, the lender can make an objective decision whether the loan modification is a better option than the alternatives, i.e., foreclosure and short payoff. For example, if a borrower's ability-to-pay rate 150 falls on scale 110 at position A, then the lender may select the foreclosure option, in which case its return rate would be Default Rate 120. The foreclosure option in this case may be preferred because Default Rate 120 is the best rate of return the lender can hope to obtain on a loan with the borrower, with those financials.

If a borrower's ability-to-pay rate 150 falls on scale 110 at the arrow labeled B, or between Default Rate 120 and Minimum Rate 130, then the lender may select the short payoff option, presuming borrower willingness. In this case, the lender's return rate would be Minimum Rate 130. The lender may thus avoid a foreclosure on the property and the lower return rate offered by that option. At the same time, Minimum Rate 130 provides a better rate of return than the lender can hope to achieve otherwise in view of the borrower's current financials.

When ability-to-pay rate 150 falls at either point A or B, it may also be a signal to the lender to reconsider aspects of the borrower's financial information. For example, the lender may wish to suggest ways to increase the borrower's ability-to-pay rate above Minimum Rate 130, because otherwise the lender may choose to liquidate the nonperforming loan either by the foreclosure or short payoff options.

If ability-to-pay rate 150 falls on scale 110 above Minimum Rate 130, for example, at the arrow labeled C, then the lender is likely to select a loan modification because the borrower's financials suggest the ability to pay the lender previously unpaid loan payments. The lender at this point would select an appropriate modification that provides a rate of return that corresponds to the borrower's ability-to-pay rate 150. Depending on how high ability-to-pay rate 150 falls on scale 110, the lender may also determine that a loan repayment plan is the optimal approach for the borrower to make up for previously unpaid loan payments. For example, if ability-to-pay rate 150 falls above the Current Rate 140, the lender knows that the borrower can afford to make monthly payments that would provide the lender with a rate of return on the investment greater than Current Rate 140. Thus, the lender's overall objective is selecting a loan modification or repayment plan is to achieve a rate of return as close as possible if not better than Current Rate 140.

General Procedure

Figure 2:
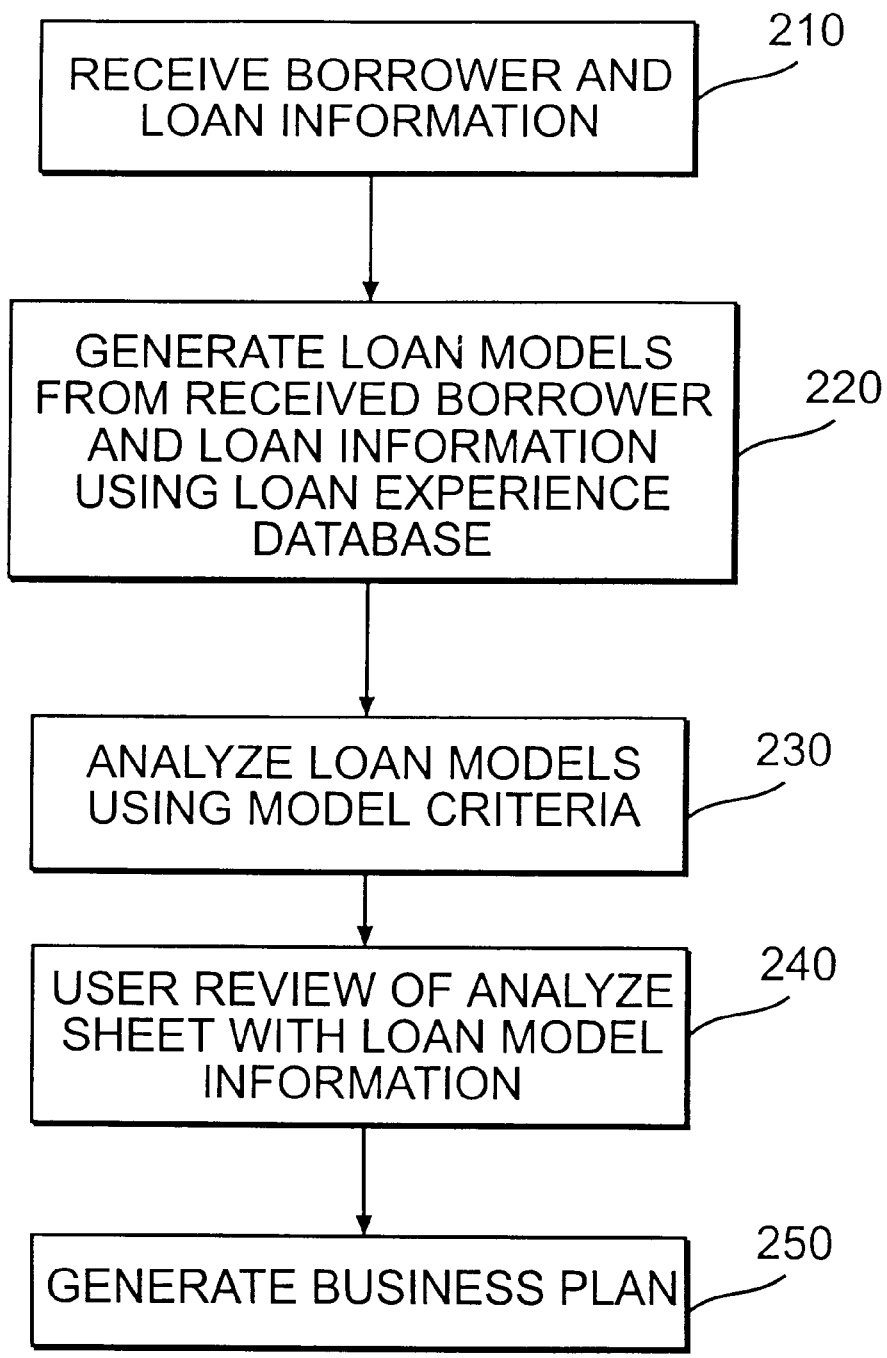
FIG. 2 is a flow chart of the operations of an investment planing system consistent with the present invention.

FIG. 2 is a flow chart of the preferred steps used by systems consistent with the present invention to enable a lender to select an optimal business plan for a nonperforming loan. The optimal business plan provides the lender with the highest rate of return given the parameters of the loan and the borrower's financials.

The present invention is preferably implemented in software that includes program code for input screens (including edit logic to modify the inputs), analytical calculations, and logical cross-checks to determine warnings, comments, recommendations, signature authority limits that appear on the business plan. The analytical calculations reference historical average table-drive data in a loan experience database. The logical cross-checks employ policy parameters coded directly into the software. These policy parameters are, in a broad sense, based on loan experience, but not explicitly on historical averages.

The first step is for the system to obtain information on the specific parameters of a loan and the borrower's financials (step 210). This may be done by importing into the system a file with the borrower's financial information, or using a graphical user interface to receive the same information. The input includes property information (e.g., address), personal information on the borrower (e.g., number of dependents), personal financial information on a monthly basis (e.g., income and expenses), assets (e.g., stocks, bonds, and cars). The input information also includes general data on the current loan and current loan data (e.g., current interest rate, principal, and remaining loan term, and proposed modifications to one or more of these) as well as data on the borrower's arrears (e.g., the number of unpaid loan payments).

With this input information, the system generates the loan models for the REO, short payoff, deed-in-lieu of loan, and charge-off options (step 220). The system also generates the model for a loan modification option. This aspect of the model generation step involves the described comparison along scale 110.

Next, the system analyzes the generated loan models with predetermined rules of a loan experience database (step 230). This step involves considering a lender's criteria for selecting the options represented by the loan models. For example, the system may generate relevant preconditions that may make a loan modification acceptable under the circumstances of a particular loan. In one scenario, the lender may require signature authority of a high-ranking company official to accept the risks involved or the lower investment yield involved with a particular deal.

After a user reviews the analyze sheet with loan model information (step 240), the system generates a business plan consistent with the lender's selection (step 250). For example, the lender may select a loan modification option for a loan, in which case the system generates the necessary documentation specifying the conditions of the modification consistent with the lender's anticipated rate of return in making the selection.

System Architecture

Figure 3:
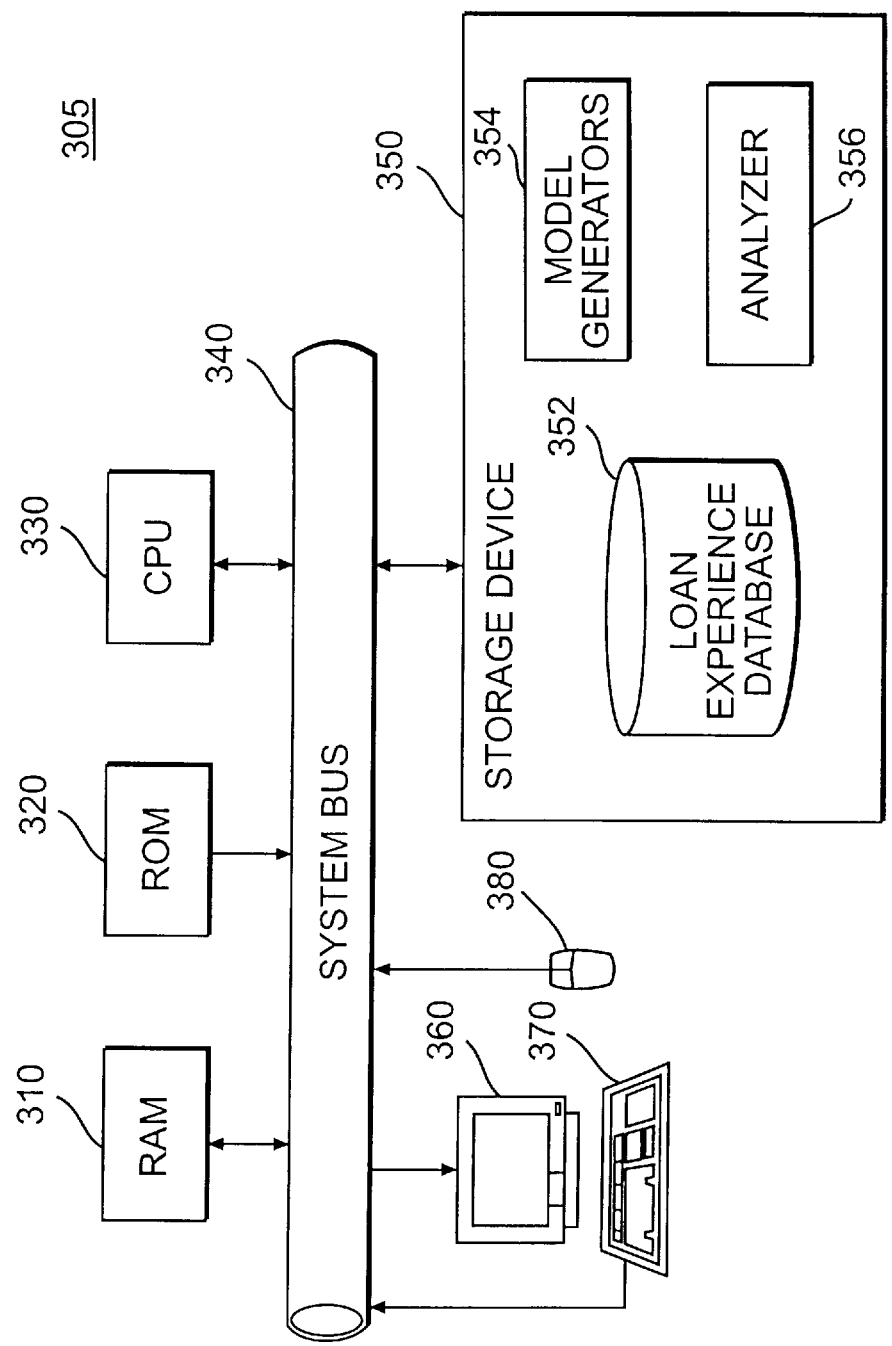
FIG. 3 is a block diagram of the investment planning system consistent with the present invention.

Systems consistent with the present invention may be implemented using a conventional personal computer, such as an IBM compatible personal computer. FIG. 3 shows an architecture 305 of one such computer for applying selection criteria in a consistent manner to better inform lenders considering the options for dealing with nonperforming loans. As shown, architecture 305 uses system bus 340 to connect RAM 310, ROM 320, CPU 330, storage device 350, monitor 360, keyboard 370, and mouse 380. These are all standard components of a personal computer. For example, CPU 330 may be a Pentium® processor manufactured by Intel Corp. Likewise, the other components are generally standard on most personal computers with one exception, storage device 350. It preferably includes three components, in addition to information relevant to the lender's consideration of the options for a nonperforming loan. They are loan experience database 352, model generators 354, and analyzer 356.

Database 352 includes a variety of information, including rules related to the lender's consideration of options for nonperforming loans and information on experience with previous nonperforming loans. The rules of database 352 are typically criteria used in favoring one option over another and criteria for alerting the lender as to issues associated with loans based on historical experiences. Database 352 also includes information on, for example, expected costs associated with foreclosures based on historical average values, normalized for time in process, for each state or territory of the United States. This includes factors that are used in determining foreclosure costs and formulas associated with the application of those factors to a particular property in light of conditions associated with the property such as its location, number of property units, or stage of delinquency.

Model generators 354 are program code used in conjunction with information from database 352 to generate loan models, and analyzer 356 is also program code that uses information from database 352 to make determinations concerning the generated loan models, e.g., determining the optimal option based on models. The program code of model generators 354 and analyzer 356 is executed by CPU 330.

Process

Figure 4:
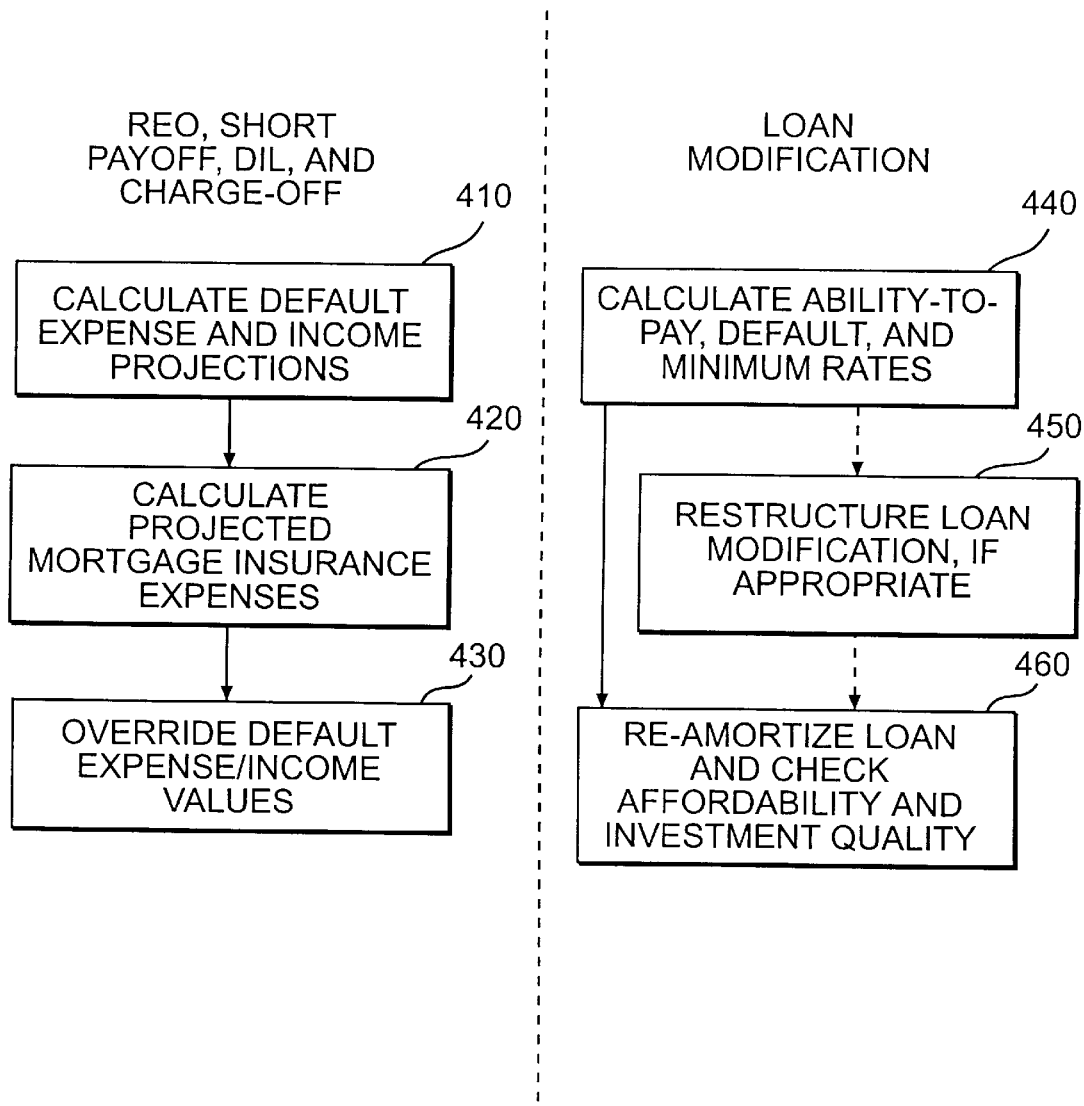
FIG. 4 is a flow chart of the steps performed by the model generators of the investment planing system consistent with the present invention.

FIG. 4 is a flow chart of the steps performed by model generator 354 consistent with the present invention for generating loan models for the REO, short payoff, deed-in-lieu, and charge-off options. In general, each model involves the same basic steps, although the models differ with regard to the information considered. As shown, the system first calculates projected default expense and projections (step 410). Referencing both information in the loan experience database and certain input information, the system generates values for projected expenses under the conditions associated with each option. For the REO model this includes the projected expenses for foreclosure, whereas the short payoff model does not include the anticipated foreclosure expenses, unless the foreclosure process has already commenced.

To estimate the foreclosure fees and costs, the system examines a table in loan experience database 352 for historical average foreclosure fees and costs for the state in which the subject property is located. The system uses these average fees and costs to compute the REO option. For the other cases (i.e., short payoff, deed-in-lieu, charge-off, loan modification options), the system estimates the date on which these fees and costs will stop accruing. For a short payoff, for example, the system projects, using information in loan experience database 352, that it will typically take 45 days from approval for the deal to close. The system then prorates the fees and costs using the number of days the loan will actually have been in foreclosure relative to the historical average time a loan in that state would spend in foreclosure. The system then adds the foreclosure fees projection to the foreclosure costs projection to arrive at the projected expense.

For example, assume experience teaches that attorney fees for completed foreclosures in New Jersey are typically $750, and the average time a loan takes to foreclose in New Jersey is about 500 days. If the system is evaluating a short payoff, and if the loan will have been in foreclosure for 250 days, the system projects that approximately 250/500, or 50%, of the fee will have accrued. Thus, the projected foreclosure fee expense calculated in the short payoff case for this deal would be $375.

The REO model considers the projected sales price of the property as well as the carry costs associated with holding the property until it is sold. The short payoff involves selling the property sooner than the foreclosure option, and this difference is reflected in the short payoff model. The deed-in-lieu of foreclosure model, on the other hand, also has costs associated with holding the property until it is sold, but this model involves selling the property sooner than in the case of a foreclosure. This is reflected in the deed-in-lieu of foreclosure model. Finally, the charge-off model is the simplest in that it concerns only the lender's total loss. This includes the total amount of the loan, interest on the unpaid loan balance, and projected expenses incurred to date.

If the borrower had insurance against the a default on the loan, then the lender may be able to recoup a certain amount of its losses out of a payment by the mortgage insurer. This is accounted for in step 420. Lastly, the system allows the user to review projected expense and income values and override these values if exact information is available in place of the projections (step 430).

In contrast, the system performs a completely different set of steps to generate a loan modification model. First, the system calculates an ability-to-pay rate, default rate, and minimum rate associated with a loan in the manner described above (step 440).

The lender may not consider a loan modification in all cases, but when it is under consideration as an option, the lender may dynamically adjust information for a proposed loan modification. In other words, the lender receives information for a proposed modification, but that information may specify terms that are not entirely acceptable to the lender. In this case, the lender may choose to propose a different modification. This requires a restructuring of the proposed loan modification (step 450). Since step 450 is not performed in all cases, a dotted line connects it between step 440 and 460.

Step 460 involves a re-amortization of the loan in accordance with a proposed loan modification and consideration of the result with regard to the borrower's financial information. Thus, the system determines the borrower's monthly payment under the loan modification and determines whether the borrower's financials indicate that the borrower can afford the new monthly payment. The loan modification is also checked against stored information on investment qualities to determine whether the loan modification meets the lender's criteria for investments. This includes considerations of risk and return associated with the deal.

After the loan models are generated, the analyzer 356 considers the various models to select the optimal plan. The steps of this process are shown in the flow chart of FIG. 5. First, the loan models are compared (step 520).

Next, analyzer 356 calculates the lender's savings as compared to selection of the foreclosure option (i.e., REO model) (step 530). This is straight-forward calculation comparing the foreclosure scenario with the other models. For example, it is determined that the economic proceeds of a sale of the property in the short payoff scenario are $100,000 and the proceeds for the sale of the property after foreclosure are $70,000. The difference, or so-called "savings over REO," is $30,000. This "savings" is calculated for each of the short payoff, deed-in-lieu, charge-off, and loan modification models.

Figure 5:
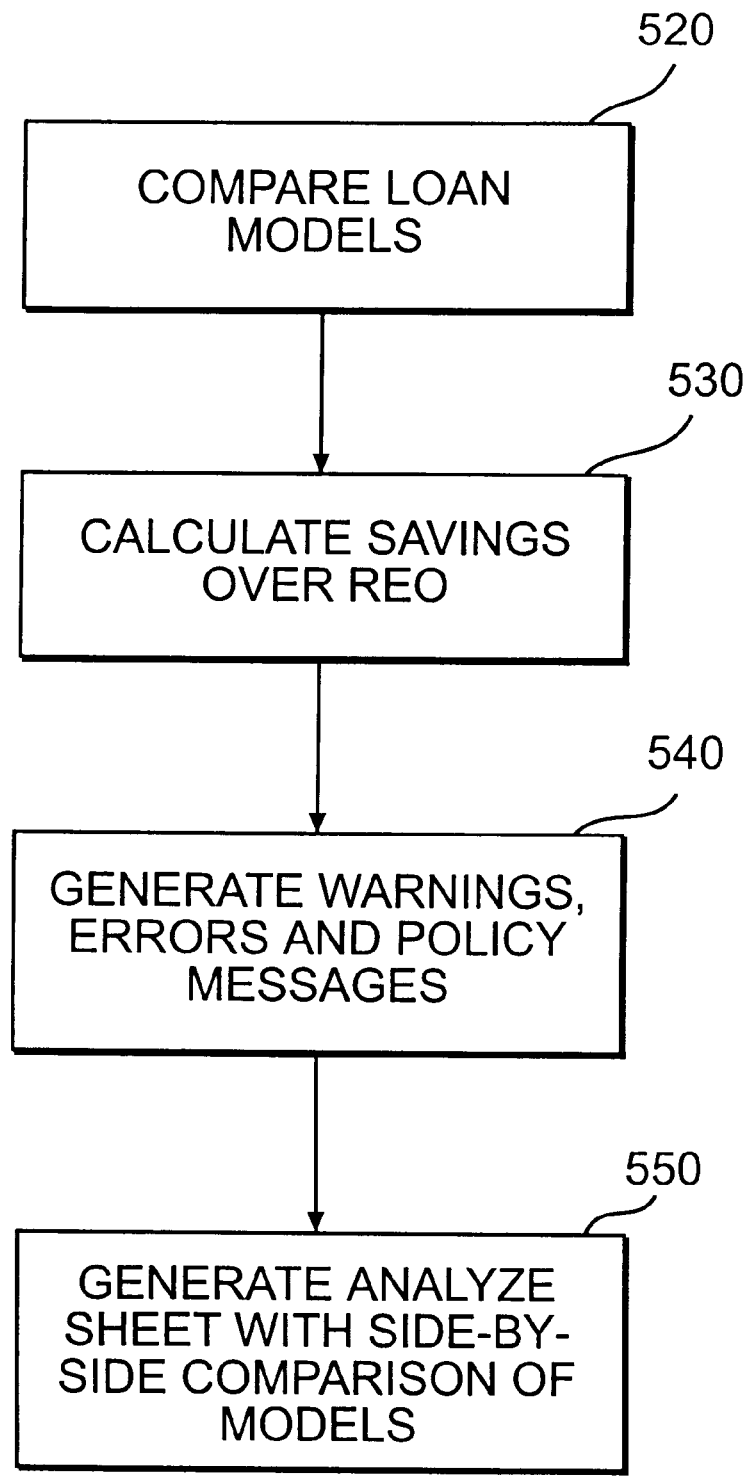
FIG. 5 is a flow chart of the steps performed by the analyzer of the investment planing system consistent with the present invention.

As shown in FIG. 5, analyzer 356 accesses stored rules on the acceptability of the various alternatives to generate warnings, errors, and policy messages (step 540). These include notifications that, for example, the borrower's financials appear to be incomplete or a loan modification requires certain signature authority. Next, analyzer 356 generates an "analyze sheet" for side-by-side comparison of the model's (step 550). An example of an analyze sheet is shown in FIG. 6.

The system also prints a business plan based on the calculated savings over REO. The business plan includes detailed information on the selected option and the signature authority required to implement the option. The plan may also include a written proposal, developed by the user, as to how it is best to implement the option.

Analyze Sheet

The example analyze sheet shown in FIG. 6, specifies the models and the results of a comparison of the models. It shows that the system considered foreclosure costs associate with the REO model that were not considered by the other models. Since the short payoff permits the lender to receive the proceeds of a sale of the property sooner than foreclosure and sale, the short payoff model reflects this time difference. For example, the amount of expenses for taxes and insurance are less for the short payoff than for the REO.

Aside from the differences, a key aspect of the analyze sheet is that it provides an objective comparison of the models using the "savings over REO." In the example sheet, the loan modification appears to be the optimal approach as it has the highest figure (i.e., $61,655) for savings over REO.

Because of their associated rates of return, the various options for approaching nonperforming loans are ranked as follows: (1) pay the loan off (including past due payments); (2) repayment plan; (3) loan modification; (4) short payoff; (5) deed-in-lieu; (6) foreclose (i.e., REO); and (6) charge-off. Lenders prefer the first option over the remaining because it has the best overall rate of return. In contrast, the charge-off option typically has the worst rate of return. Historically;, lenders considered each approach according to this order without regard to a quantitative valuation of the options.

The comparison aspect of analyzer 356, i.e., comparing the various options, uses an iterative process based on a hierarchy of the options that permits lenders to make a more quantitative evaluation of the options. When all the necessary data is input or imported, and the data accurately reflects a given situation, and the borrower has plenty of income, analyzer 356 actually supports the hierarchy of choices. The top two options are not reflected by analyzer 356, although there acceptability for a given nonperforming loan will become apparent from the information input into the system.

On the other hand, if the borrower does not have any income, the third option, i.e., the loan modification option, may not be acceptable because the borrower cannot pay the lender anything back, and the economic valuation of that option is poor. Typically, a borrower wishes a loan modification because it seems to be the best option. The borrower often asks the lender either to forgive the overdue debt and start again now the borrower's income is re-established, or the borrower asks the lender to lower the loan balance to the current fair market value of the property. In other words, the system's starting point for assessing a given loan option is with a borrower requesting one of the specific options. For example, if the borrower knows that he or she simply wants to get out of a house, the short sale option would be preferred.

Thus, a loan counselor using the system would first look at the output from analyzer 356 and typically see that if a loan modification is a viable option. If it appears that a loan modification is viable, the counselor accesses data for the loan modification model, and verifies the accuracy of the data. The counselor often discovers inaccurate financial information for the borrower, such as unreasonable expenses, and tries to construct an accurate view of the borrower's income and expenses. Once this is done, the loan modification model makes the rate of return comparison and the counselor picks the lowest viable rate that the system's policy and signature authority rules allow.

The counselor then checks analyzer 356. If the selected interest rate for the loan modification is very low, the savings over REO for the loan modification option may be very low or even negative. If the loan modification savings over REO are lower than other options, the counselor has two options: (1) have the borrower restructure other debit payments to create more room available income to make higher payments (which in turn provides a higher rate of return for the lender), or (2) counsel the borrower to pursue a higher economic value option.

The savings over REO calculation for a loan modification is calculated as follows: (1) Calculate the projected loss to the investor if the loan were to go to REO in accordance with previously described calculations. (2) Calculate the net present value of the amount by which the borrower payments will be lower than what could be achieved at market interest rates (the TDR loss—Troubled Debt Restructuring), for a period specified by the Financial Accounting Standards Board (FASB). Subtract (2) from (1) to produce the savings over REO for a loan modification.

For example, if the model projects the lender would lose $40,000 if the loan goes to foreclosure (i.e., REO) and the TDR figure is $27,000 then the savings over REO is $17,000. This signals the lender to examine the short payoff option because more money may be saved using that approach. Alternatively, the lender may be able to get the borrower to pay more than 3% to reduce the TDR loss, making the loan modification option viable again.

Conclusion

Systems consistent with the present invention thus provide lenders with a scheme for applying selection criteria in a consistent manner to better inform lenders considering the options for dealing with nonperforming loans. They also help lenders select the best option for each case, considering the borrower's financial condition and any hardships that caused the lender to categorize the loan as a nonperforming one. It will be apparent to those skilled in the art that various modifications and variations can be made in the system and processes of the present invention without departing from the spirit or scope of the invention. The present invention covers the modifications and variations of this invention that come within the scope of the appended claims and their equivalents. In this context, equivalents means each and every implementation for carrying out the functions recited in the claims, even if not explicitly described herein.

What is claimed is:

1. A method for determining acceptable interest rates for real estate loans comprising the steps, performed by a processor, of:
    (a) receiving loan data including personal data relating to a borrower, financial information relating to the borrower's financial position, and loan conditions including a loan term and information on the corresponding real estate, related to a real estate loan;
    (b) analyzing the borrower's financial information to determine an ability-to-pay rate reflecting an interest rate on the loan based on the borrower's ability to repay a loan in accordance with the loan conditions;
    (c) determining from the loan data a default rate reflecting an interest rate realizable if the loan is foreclosed and a new loan secured by the real estate originated;
    (d) determining from the loan data a minimum rate reflecting an interest rate realizable if proceeds from a sale of the real estate before expiration of the loan term are determined to be acceptable and a new loan secured by the real estate originated; and
    (e) selecting an acceptable return rate reflecting lender preferences based on the ability-to-pay rate, the default rate, the minimum rate, and a predetermined current return rate.

2. The method of claim 1, wherein the loan conditions include a loan amount and a loan rate, and wherein the selecting step includes the substep of:
    modifying the loan conditions to provide the acceptable return rate.

3. The method of claim 2, wherein the modifying step includes the substep of:
    iteratively performing steps (b) though (e) with the modified loan conditions.

4. The method of claim 1, further comprising the step of:
    displaying a form reflecting the acceptable return rate such that it advises an investor of possible investment strategies.

5. An apparatus for determining acceptable interest rates for real estate loans comprising:
    a memory having program instructions; and
    a processor responsive to the program instructions and configured to:
        receive loan data including personal data relating to a borrower, financial information relating to the borrower's financial position, and loan conditions including a loan term and information on the corresponding real estate, related to a real estate loan,
        analyze the borrower's financial information to determine an ability-to-pay rate reflecting an interest rate on the loan based on the borrower's ability to repay a loan in accordance with the loan conditions,
        determine from the loan data a default rate reflecting an interest rate realizable if the loan is foreclosed and a new loan secured by the real estate originated,
        determine from the requested loan data a minimum rate reflecting an interest rate realizable if proceeds from a sale of the real estate before expiration of the loan term are determined to be acceptable and a new loan secured by the real estate originated, and
        select an acceptable return rate reflecting lender preferences based on the ability-to-pay rate, the default rate, the minimum rate, and a predetermined current return rate.

6. The apparatus of claim 5, wherein the loan conditions include a loan amount and a loan rate, and wherein the apparatus further comprises:
    means for modifying the loan conditions to provide the acceptable return rate.

7. The method of claim 5, further comprising:
    means for displaying a form reflecting the acceptable return rate such that it advises an investor of possible investment strategies.

8. A method for determining acceptable interest rates for real estate loans comprising the steps, performed by a processor, of:
    (a) receiving loan data including personal data relating to a borrower, financial information relating to the borrower's financial position, and loan conditions including a loan term and information on the corresponding real estate, related to a real estate loan;
    (b) analyzing the borrower's financial information to determine an ability-to-pay rate reflecting an interest rate on the loan based on the borrower's ability to repay a loan in accordance with the loan conditions;

(c) determining from the loan data a default rate reflecting an interest rate realizable if the loan is foreclosed and a new loan secured by the real estate originated;

(d) determining from the loan data a minimum rate reflecting an interest rate realizable if proceeds from a sale of the real estate before expiration of the loan term are determined to be acceptable and a new loan secured by the real estate originated;

(e) generating a comparison model from the borrower's financial information, the comparison model including the ability-to-pay rate, the default rate, and the minimum rate;

(f) analyzing the comparison model to determine a relationship among the ability-to-pay rate, the default rate, the minimum rate, and a predetermined current return rate;

(g) extracting lender preferences from a constraints database; and (h) selecting an acceptable return rate for the loan based on the relationship, the lender preferences, an the personal data.

9. An apparatus for determining acceptable interest rates for real estate loans comprising:

a memory having program instructions; and a processor responsive to the program instructions and configured for:

receiving loan data including personal data relating to a borrower, financial information relating to the borrower's financial position, and loan conditions including a loan term and information on the corresponding real estate, related to a real estate loan, analyzing the borrower's financial information to determine an ability-to-pay rate reflecting an interest rate on the loan based on the borrower's ability to repay a loan in accordance with the loan conditions, determining from the loan data a default rate reflecting an interest rate realizable if the loan is foreclosed and a new loan secured by the real estate originated, determining from the data a minimum rate reflecting an interest rate realizable if proceeds from a sale of the real estate before expiration of the loan term are determined to be acceptable and a new loan secured by the real estate originated, generating a comparison model from the borrower's financial information, the comparison model including the ability-to-pay rate, the default rate, and the minimum rate, analyzing the comparison model to determine a relationship among the ability-to-pay rate, the default rate, the minimum rate, and a predetermined current return rate, extracting lender preferences from a constraints database, and selecting an acceptable return rate for the loan based on the relationship, the lender preferences, and the personal data.

* * * * *